United States Patent Office 3,494,848
Patented Feb. 10, 1970

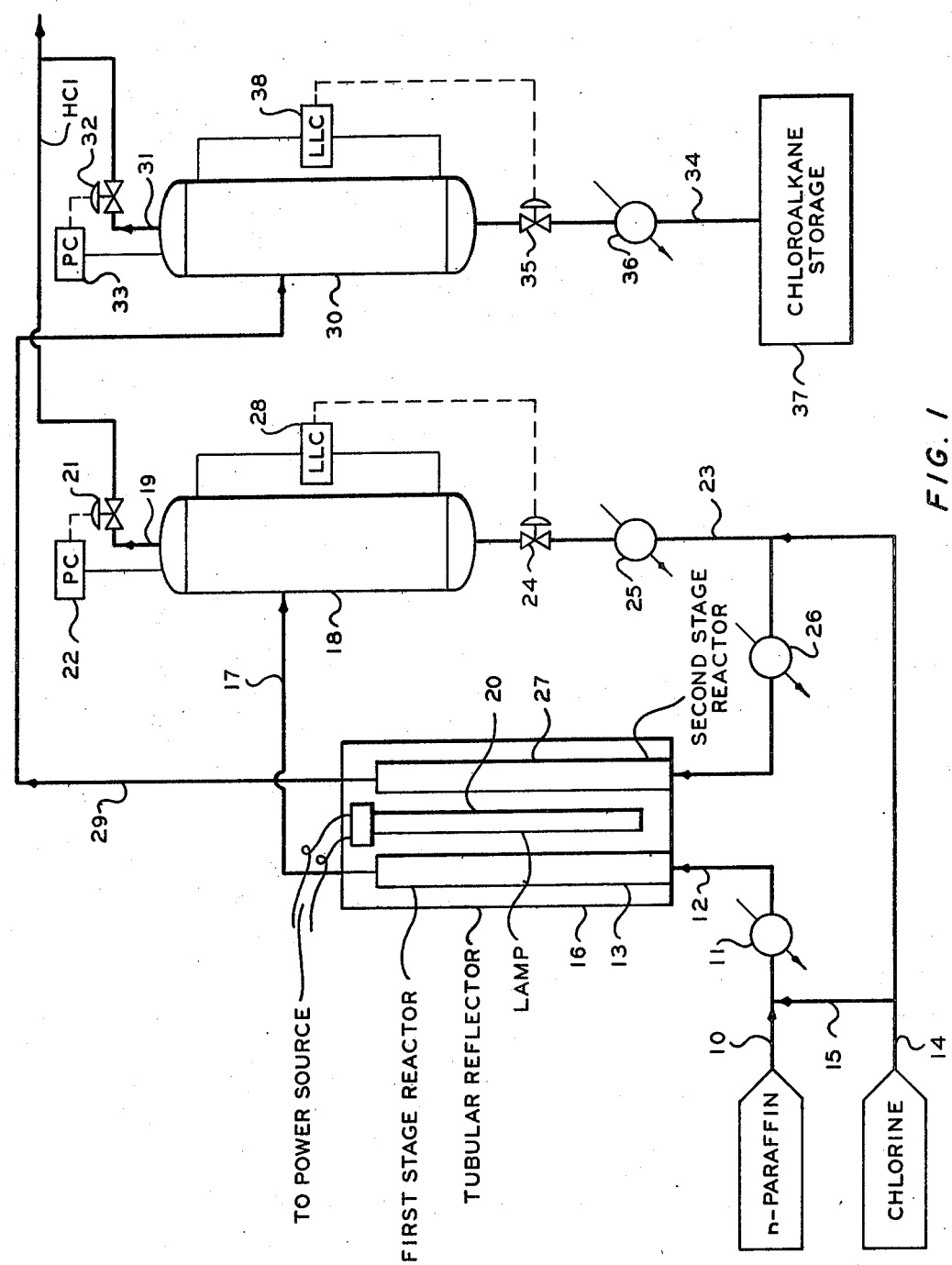

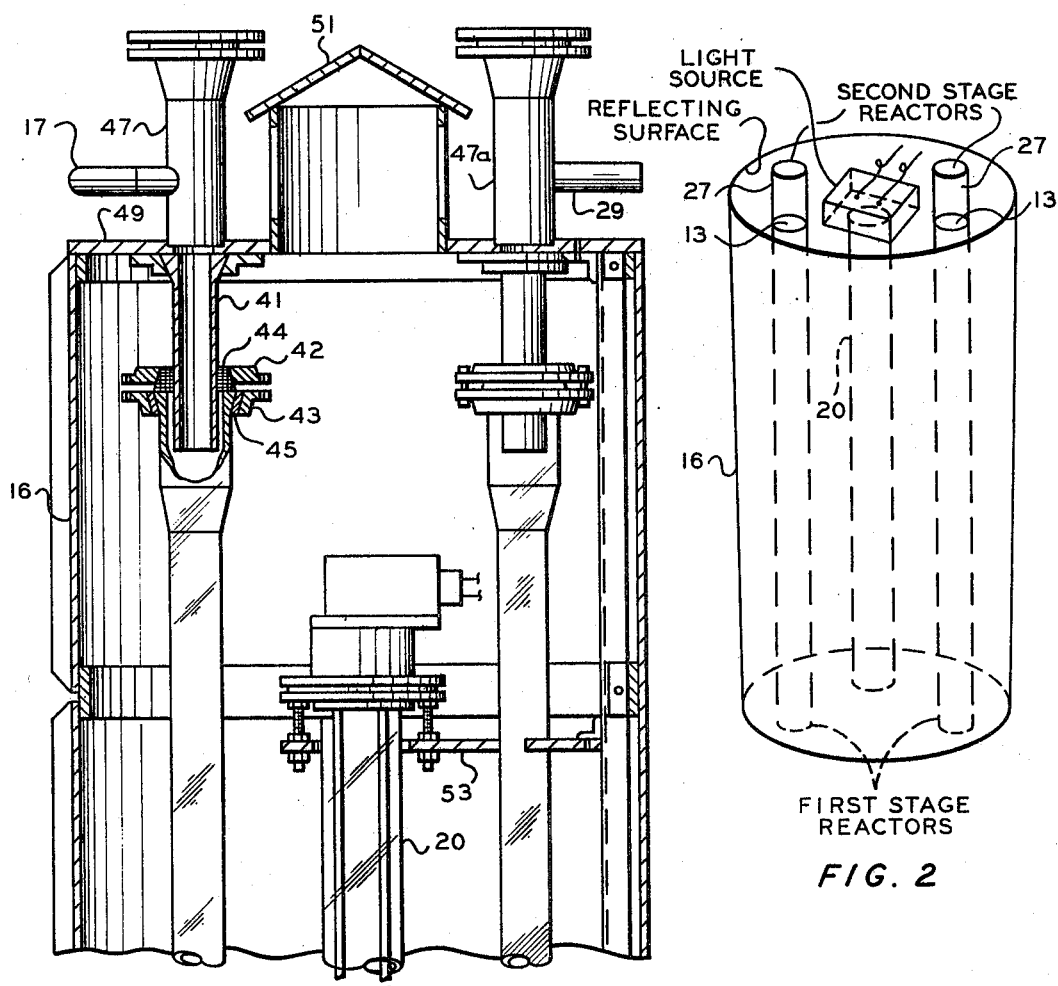
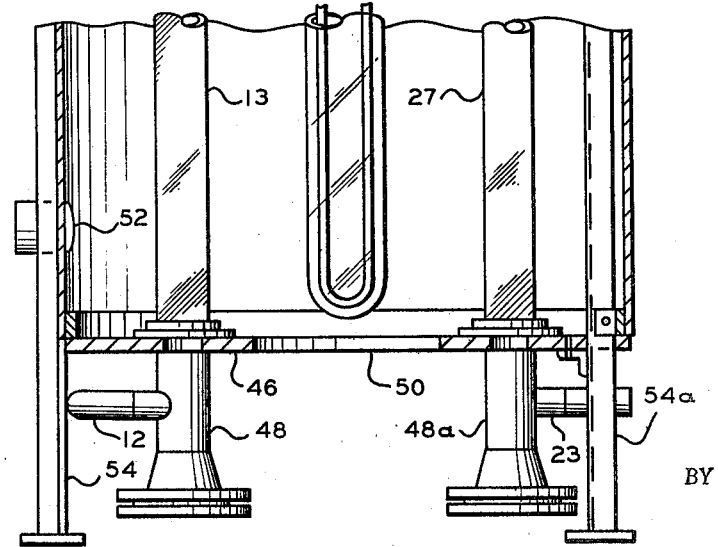

3,494,848
APPARATUS FOR PHOTOHALOGENATION
Thomas Hutson, Jr., and Allan D. Holiday, Bartlesville, Okla., assignors to Phillips Petroleum Company, a corporation of Delaware
Original application Feb. 19, 1965, Ser. No. 433,907, now Patent No. 3,402,114, dated Sept. 17, 1968. Divided and this application Apr. 19, 1968, Ser. No. 738,752
Int. Cl. B01k 1/00
U.S. Cl. 204—193          4 Claims

ABSTRACT OF THE DISCLOSURE

A reactor for photohalogenation comprising a vertical, hollow, right cylinder having an inner reflecting surface and an elongated light source positioned at the longitudinal axis of said cylinder. A plurality of transparent, tubular reaction chambers with inlet and outlet means are spaced within the cylinder parallel to said light source and substantially equidistant from said light source and said reflecting surface. Air inlet means and air outlet means are provided in the lower portion and upper portion of the cylinder, respectively, for cooling.

---

This is a division of application Ser. No. 433,907, filed Feb. 19, 1965, now U.S. Patent No. 3,402,114.

This invention relates to the halogenation of hydrocarbons. In one aspect this invention relates to a novel method and means for producing monohalogenated hydrocarbons in high yield with respect to dihalogenated hydrocarbon byproducts.

The halogenation of hydrocarbons is known and has been accomplished in both gaseous and liquid phases; thus the production of chlorinated, brominated, iodinated and fluorinated hydrocarbons has been accomplished. Light and particularly ultraviolet light is a known catalyst for the halogenation of paraffin hydrocarbons. The production of monohalogenated hydrocarbons has been difficult because the halogenation reaction occurs stepwise and is not an equilibrium reaction so that, given sufficient residence time and sufficient halogen at reaction conditions the reaction product would contain no monohalogenated hydrocarbons at all. For many uses, such as the production of linear detergent alkylate, made from alkyl chlorides containing from 7 to 15 carbon atoms, a monohalogenated, e.g., monochlorinated, hydrocarbon is required as the starting material.

Staged or stepwise halogenation of hydrocarbons is desirable because in this manner higher conversion of hydrocarbon to monohalide can be obtained with minimum production of byproduct dihalide. Higher conversion reduces the amount of recycle and thus reduces the size of alkylation equipment required because less unreacted hydrocarbon is passed through the alkylation equipment. Staged halogenation procedures heretofore proposed have encountered problems of reaction control and excessive energy requirements in providing sufficient radiation for the reaction.

According to the present invention the stepwise halogenation of hydrocarbons so as to produce a high ratio of monohalogenated hydrocarbons to dihalogenated hydrocarbons is improved by positioning the light source at the center of a cylindrical surface and positioning the transparent reactors between the light source and reflecting surface. We have found that the radiation from the light source is more efficiently utilized by direct reflection of light rays than if the light rays are focused onto or into the reactor. When radiation is focused onto or into a transparent reactor containing a hydrocarbon and a halide, the reaction rate at the focal point is accelerated so that an undesirable amount of dihalogenated hydrocarbon is produced whereas the reaction rate other than at the focal point is so low that free chlorine remains in the reactor effluent. In a cylindrical reactor with a centrally positioned light source the radiation is reflected directly, without concentration, with the result that the reaction is catalyzed substantially uniformly throughout the interior of the reactor. The circular reflector will continue to reflect the radiation, without concentration, until it is absorbed in the reaction or dissipated as heat.

It is an object of this invention to provide a method and means for producing monohalogenated hydrocarbons in high yield. It is also an object to provide means for the conservation of radiant energy in the halogenation of hydrocarbons. It is a further object of the invention to provide simple and positive means for controlling the reaction in the halogenation of hydrocarbons. Other objects and advantages of the invention will be apparent to one skilled in the art upon studying the disclosure including the detailed description of the invention and the appended drawing wherein:

FIGURE 1 is a schematic representation of a halogenation plant incorporating therein the process and apparatus of the invention;

FIGURE 2 is an X-ray view of a reactor assembly of the invention; and

FIGURE 3 is an elevational view, in cross-section, of a reactor assembly of the invention.

Referring now to the drawing, and particularly to FIGURE 1, a normal paraffin such as normal heptane is passed via conduit 10, cooler 11, and conduit 12 to first stage reactor 13. A halogen such as chlorine is added to conduit 10 via conduit 14 and conduit 15. First stage reactor 13 positioned in tubular reflector housing 16 can be one or more transparent tubes such as glass, quartz or other material that is heat-resistant, inert to halogens and transparent to light in the range of about 2000 to 7000 angstrom units. Light is supplied by lamp 20 centrally positioned in the tubular reflector 16 which has a mirror finish on its inner surface. Reflector 16 can be made of mirror glass or polished metal. Lamp 20 can be any type of illumination emitting light in the range of about 2000 to 7000 angstrom units.

The effluent from the first stage reactor passes via conduit 17 to flash chamber 18 where hydrogen chloride (HCl) is flashed and removed via conduit 19 and motor valve 21 which is controlled by pressure controller 22. Liquid is removed from flash chamber 18 via conduit 23 containing motor valve 24 and coolers 25 and 26 and is passed to second stage reactor 27. Second stage reactor 27 is a transparent tube such as that of first stage reactor 13. Motor valve 24 is controlled by liquid level controller 28.

The effluent from the second stage reactor passes via conduit 29 to flash chamber 30 where HCl is flashed and removed via conduit 31 and motor valve 32 which is controlled by pressure controller 33. Liquid product is removed from flash chamber 30 via conduit 34 containing motor valve 35 and cooler 36 and is passed to storage 37. Motor valve 35 is controlled by liquid level controller 38.

FIGURE 2 shows the first and second stage reactors in the circular reflector tube 16. Two first stage reactors 13 and two second stage reactors 27 are shown as forming a reactor bank although more can be employed if desired. More than one bank of reactors can be employed.

FIGURE 3 shows, in greater detail, a reactor assembly according to the invention. The upper end of glass tube 13 is connected to a metal tube 41 by means of a flange connection comprising metal flanges 42 and 43, resilient sealing gasket 44, and plastic gasket 45. A similar connection is made at the bottom of the glass tube to metal floor 46. Conduit stubs 47 and 48 are secured to the top 49 and bottom 46, respectively, of the circular reflector housing. Conduit 12 connects to stub 48 and conduit 17 connects to stub 47. Stubs 47 and 48 are blind flanged and the flanges can be removed to facilitate cleaning the reactor tubes. The blind flange can be connected to the stub flange by bolts or other means (not shown).

The conduit 41 extends through the flanged connection into the reactor tube 13 to provide an expansion joint to compensate for the different coefficients of expansion of the transparent reactor tube 13 and the metal conduit 41.

An opening 50 in the bottom or floor of the reflector housing 16 and a roofed vent 51 at the top of the housing induces circulation of air through the housing to effect cooling of the reactor tubes 13 and 27 by removing heated air. An opening 52 in the side of the reflector housing can be connected to a blower or compressor to increase the flow of air or other cooling gas through the reflector housing.

Reactor 27 is positioned and secured in the housing in the same manner as reactor 13. Lamp 20 is secured to the housing 16 by a bracket 53. Rolled metal structures in the form of an angle, usually called angle irons, identified at 54 and 54a provide rigidity to the reflector housing and provide legs for supporting the housing above the ground or floor of the structure housing the plant equipment.

The light source is operated at a substantially constant energy level and the reaction is controlled by varying the residence time of the halogen-containing stream in the transparent reactor tube. Thus each reactor tube effluent conduit such as represented by 17 and 29 can be operatively connected to an analyzer such as a pair of photoelectric cells as described in U.S. Patent 2,854,585, issued Sept. 30, 1958, to B. J. Simmons. A sample taken from the effluent conduit, e.g., 17, is passed through a first photoelectric cell, subjected to light rays of sufficient intensity to react any residual chlorine and then passed through the second photoelectric cell. The effluent conduit should be completely free of free chlorine. If chlorine is detected in the reactor effluent, the analyzer can pass a signal to a rate of flow controller connected to a control valve in the inlet conduit, e.g. 12, so that the residence time in reactor is increased.

Alternatively the valve in the inlet conduit can be operated manually in response to visual observation of the reactor effluent. The presence of chlorine is the effluent can be detected by the unaided eye.

Staged halogenation can be employed to increase the mono- to dihalogenated hydrocarbon at a selected conversion level or can be employed to raise the conversion level with minimum production of dihalogenated hydrocarbon. This is illustrated by the following examples.

EXAMPLE I

Normal dodecane was chlorinated to a conversion level of 29.0 weight percent in a single pass and the mono- to dichloride ratio was 2.86 Normal tridecane was similarly chlorinated to a conversion level of 29.1 weight percent in two passes with resaturation with chlorine, removal of hydrogen chloride and cooling between passes and the mono- to dichloride ratio was 4.36. There is no appreciable difference between the reactivity of normal dodecane and normal tridecane for chlorine and these two runs are compared because they were chlorinated under the same conditions to substantially the same conversion level. These runs show the improvement in mono/di ratio in stepwise chlorination to the same conversion level.

EXAMPLE II

Normal tetradecane was chlorinated to a higher conversion level in two passes with resaturation of the first pass effluent with chlorine, removal of hydrogen chloride and cooling prior to the second pass. The results of these runs are tabulated below in the table.

TABLE.—PHOTOCHLORINATION OF NORMAL TETRADECANE

|  | Run Number | |
|---|---|---|
|  | 1 | 2 |
| Reactor Conditions: |  |  |
| No passes | 1 | 2 |
| Temperature in °F | 60 | 60 |
| Pressure, p.s.i. | 50 | 50 |
| Residence time, sec. | 14.13 | 14.07 |
| N-paraffin conversion, percent | 16.5 | [1] 38.1 |
| Product Characteristics: |  |  |
| API gravity | 47.8 | 42.0 |
| Chlorine, wt. percent | 3.5 | 7.7 |
| Monochloride/Dichloride, mole ratio | 17.8 | 5.37 |
| Saybolt color | +12 | −15 |
| CLC analysis, wt. percent: |  |  |
| N-tetradecane | 83.5 | 61.9 |
| Monochloro tetradecane | 15.5 | 31.4 |
| Dichloro tetradecane | 1.0 | 6.7 |

[1] Total conversion for two passes.

The results of the table show that the halogenation reaction can be carried out to a high conversion level stepwise with a nominal production of dihalide. This reduces the amount of recycle and therefore reduces the size of expensive downstream equipment. The present invention provides means for simplifying and improving the efficiency of the staged halogenation reaction.

That which is claimed is:

1. Apparatus for the stepwise halogenation of a hydrocarbon comprising a vertical, hollow, right cylinder having an inner reflecting surface:
   air outlet means in the upper portion;
   an elongated light source positioned at the longitudinal axis of said cylinder;
   a plurality of transparent, tubular reaction chambers spaced apart from each other, parallel to said light source and substantially equidistant from said light source and said reflecting surface;
   means to introduce a reactant stream to the lower portion of each of said reaction chambers; and
   means to remove a reaction effluent from the upper portion of each of said reaction chambers.

2. The apparatus of claim 1 wherein a means to introduce a coolant stream is connected to the interior of said cylinder in the lower portion thereof.

3. The apparatus of claim 1 wherein each transparent tubular reactor is connected to an opaque tube in the upper portion of the cylinder by means of an expansion joint.

4. The apparatus of claim 1 wherein one end of an opaque tube is connected to each end of each transparent reactor and the other end of each opaque tube is sealed by a blind flange connection to facilitate access to the transparent reactors for cleaning.

References Cited

UNITED STATES PATENTS

| 2,622,205 | 12/1952 | Miller et al. | 204—193 |
| 3,296,108 | 1/1967 | Hutson et al. | 204—193 |
| 3,431,188 | 3/1969 | Ito et al. | 204—193 |

HOWARD S. WILLIAMS, Primary Examiner

U.S. Cl. X.R.

250—49.5

UNITED STATES PATENT OFFICE
CERTIFICATE OF CORRECTION

Patent No. 3,494,848            Dated February 10, 1970

Inventor(s) Thomas Hutson, Jr., et al.

It is certified that error appears in the above-identified patent and that said Letters Patent are hereby corrected as shown below:

Column 4, after line 35 and before line 36, insert -- air inlet means in the lower portion; --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents